US007639709B1

(12) United States Patent
Amis et al.

(10) Patent No.: US 7,639,709 B1
(45) Date of Patent: Dec. 29, 2009

(54) SYSTEM AND METHOD FOR BROADCAST CONFLICT RESOLUTION

(75) Inventors: Alan D. Amis, Plano, TX (US); Hersh B. Parekh, Plano, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 452 days.

(21) Appl. No.: 11/337,014

(22) Filed: Jan. 20, 2006

(51) Int. Cl.
 H04J 3/02 (2006.01)
 H04J 3/00 (2006.01)
 H04L 12/28 (2006.01)
 H04W 72/04 (2009.01)
 H04W 72/10 (2009.01)
(52) U.S. Cl. .................. 370/462; 370/345; 370/431; 455/450
(58) Field of Classification Search .......... 370/345, 370/462, 444, 447, 461
 See application file for complete search history.

(56) References Cited

U.S. PATENT DOCUMENTS

| 6,574,199 | B1 * | 6/2003 | Young et al. | 370/254 |
| 2003/0012176 | A1 * | 1/2003 | Kondylis et al. | 370/348 |
| 2004/0100929 | A1 * | 5/2004 | Garcia-Luna-Aceves | 370/328 |
| 2006/0171332 | A1 * | 8/2006 | Barnum | 370/254 |
| 2006/0198346 | A1 * | 9/2006 | Liu et al. | 370/254 |
| 2006/0215582 | A1 * | 9/2006 | Castagnoli et al. | 370/254 |
| 2006/0268792 | A1 * | 11/2006 | Belcea | 370/338 |
| 2007/0070918 | A1 * | 3/2007 | Hershey | 370/254 |

FOREIGN PATENT DOCUMENTS

EP  1126669 A1 * 8/2001

OTHER PUBLICATIONS

Author: Young, C.D.; Title: USAP: A Unifying Dynamic Distributed Multichannel TDMA Slot Assignment Protocol; Date: Oct. 21-24, 1996; vol. 1; pp. 235-239.*
Authors: Stefano Basagni, Danilo Bruschi and Imrich Chlamtac; Title: A Mobility-Transparent Deterministic Broadcast Mechanism for Ad Hoc Networks; Date: Dec. 1999; Publisher: IEEE Press; vol. 7, Issue 6; pp. 799-807.*

* cited by examiner

*Primary Examiner*—Nick Corsaro
*Assistant Examiner*—Tangela T. Chambers
(74) *Attorney, Agent, or Firm*—Matthew J. Evans; Daniel H. Barbieri

(57) ABSTRACT

The present invention is a system and method for providing conflict resolution for broadcast slot assignments. Method may include receiving a message from at least two nodes. Method may determine from received messages that at least two other nodes in a network have elected to transmit in a single broadcast slot. Method may determine individual node identifier information for each of a second and third node. Method may arrange a second and third node in an order based on individual node identifier information determination. Prior to the completion of a bootstrap cycle, method may select which of a second or third node may utilize the desired broadcast slot based on the arranged order for each of the second and third node. Method may broadcast a node selection to all nodes in a network.

20 Claims, 3 Drawing Sheets

SYSTEM AND METHOD FOR BROADCAST CONFLICT RESOLUTION

FIELD OF THE INVENTION

The present invention relates to network communications. More particularly, the present invention relates to a system and method for nearly immediate resolution of broadcast slot assignment conflicts in a network.

BACKGROUND OF THE INVENTION

Mobile networks are utilized in a variety of tactical military and commercial applications. These applications often require a mobile network to be self-organizing, wireless networks that can operate in dynamic environments and provide peer-to-peer, multi-hop, multi-media communications. As a result, mobile networks are known for their rapid and convenient deployment, self-organization, mobility, and survivability. To accomplish these goals, mobile networks generally include a neighborhood defined by nodes that may be within line of sight of a transmitting node. Such line of sight nodes are generally termed to be within one "hop" of the transmitting node. In these types of networks, a transmission from one node may be broadcast to all nodes in its "neighborhood". Typically, in order for data transmitted from a node to propagate multiple hops, the data must be relayed by one or more node neighbors. The data may be relayed in this manner until it has arrived at all intended destination nodes.

One important aspect of data transmission via a nodal network is the ability of neighboring nodes to transmit without interference. However, in a multiple access broadcast network, all network nodes may share a single shared communication channel, which may increase the possibility that two or more transmissions may collide. This may be especially true when two or more nodes transmit at overlapping times. Because there may be limitations on the number of simultaneous transmissions that a receiver can successfully process, collisions are typically avoided by the assignment of time slots in which individual nodes can transmit. To accomplish this, a node may select a time slot and channel that may not cause a collision at the intended receiver. However, during scheduling, a situation may occur where two or more nodes propose to utilize a particular slot. This is especially problematic when 2 or more nodes that are 2 or more hops apart, and therefore cannot hear each other, attempt to use the same fixed slot on the same channel. The result may be interference at the node connecting the 2 or more nodes.

Typically, this interference may be resolved by a bootstrap slot at the receiving node identifying that a conflict or contention exists. Conflict identification by a bootstrap slot generally results in all contending nodes backing off and selecting alternative broadcast slots for transmission. However, because the bootstrap slot for the resolving node may have already passed, conflict resolution generally requires the completion of an entire bootstrap cycle, which may consist of a number of frames, prior to resolution. Disadvantageously, this latency in conflict resolution often results in unreliable broadcast transmissions at the node receiving multiple transmissions.

Consequently, it would be advantageous if a system and method existed which quickly resolved broadcast slot assignment conflicts.

SUMMARY OF THE INVENTION

Accordingly, the present invention is directed to a novel system and method for providing conflict resolution for broadcast slot assignments. A node may run the conflict resolution protocol to determine if a conflict exists among at least two other nodes in a given network. A conflict may be realized when a first node determines at least two other nodes in a network have elected to transmit in a single broadcast slot. Node priority may be determined based on a node identifier for each node. Prior to the completion of a cycle, a first node may select which of a second or third node may utilize the desired broadcast slot based on which of the second and third node is given priority.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to presently preferred embodiments of the invention, examples of which are illustrated in the accompanying drawings.

Figure 1:
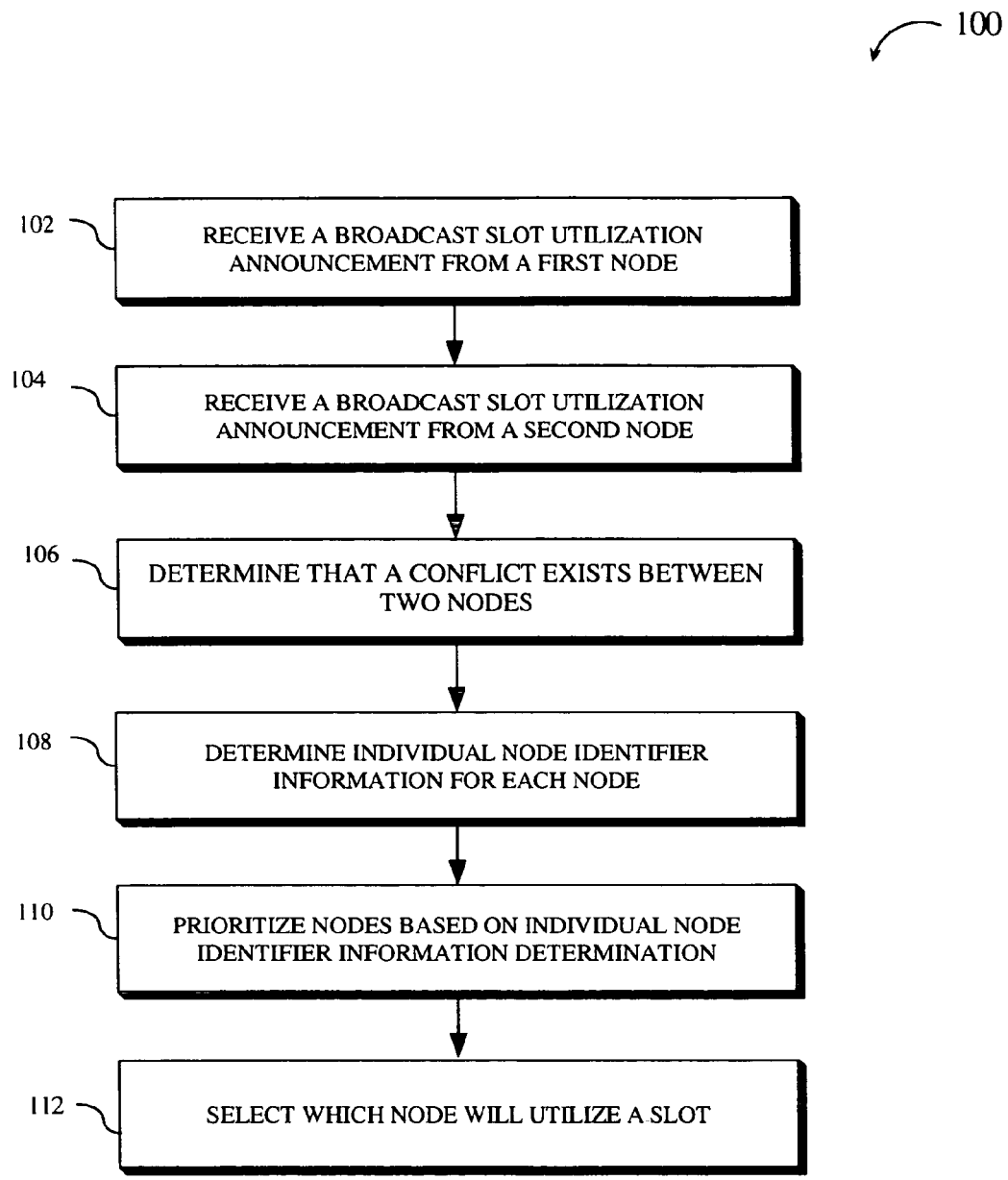
FIG. 1 is a flowchart of a method for broadcast conflict resolution in accordance with an exemplary embodiment the present invention.

Referring to FIG. 1, a flowchart of a method 100 for broadcast conflict resolution in accordance with an exemplary embodiment the present invention is shown. Method 100 may include receiving a broadcast slot utilization announcement from a first node in a network 102. Method 100 may also include receiving a substantially similar broadcast slot utilization announcement from a second node in a network 104. For example, the broadcast slot utilization announcements may be comprised of each node announcing an election to transmit in a particular available broadcast slot. Broadcast slot may refer to a slot suitable for transmitter based broadcast. Nodes may be transceiver nodes having neighboring transceiver nodes in a network of transceiver nodes. Each node may communicate during a specific time slot and utilize multiple frequencies on a time multiplex basis. Nodes may communicate with each other in a specific neighborhood as well as with nodes outside their particular neighborhood. In an embodiment of the present invention, the first and second nodes may be spatially isolated. For example, the first node and the second node may be at least two hops apart in a multi-hop network.

Method 100 may be suitable for transmission methods such as node activation. Node activation may refer to a transmission method whereby a node may broadcast to all neighbors simultaneously. Node activation, or broadcast, may be suitable for applications such as address resolution, conferencing and the like. In a preferred embodiment, method 100 may be implemented with the Unifying Slot Assignment Protocol (USAP). USAP may refer to a dynamic assignment protocol that monitors a radio frequency (RF) environment, allocates channel resources and automatically detects and resolves contention among nodes resulting from changes in connectivity. USAP may separate slot assignment from a heuristic for choosing the number of slots to assign to each neighboring node and coordinating node activation. Advantageously, USAP may be utilized to support a variety of higher layer heuristics for selecting the number of slots to be activated with which neighbors.

Specifically, method 100 may be implemented with USAP at the medium access control (MAC) layer. A MAC layer may manage and maintain communications between radio network cards and access points by coordinating access to a shared radio channel and utilizing protocols that enhance communications over a wireless medium. Additional MAC layer functions may include scanning, authentication, association and fragmentation. Further, the MAC layer may be responsible for moving data packets to and from one Network Interface Card (NIC) to another across a shared channel.

MAC layer frame structure may support bootstrap, broadcast, and traffic slots for transmission of information. A bootstrap slot may refer to a slot having the primary function of sharing information necessary to dynamically assign unassigned slots. A bootstrap slot may also include one or more fields for identifying the broadcast slot selected, for indicating a range of the bootstrap, and for transmitting synchronization data. Additionally, a field of the bootstrap may be utilized to explicitly reserve slots for creating virtual circuits. A bootstrap slot may contain the minimum information necessary to bring the network up to operational status. Bootstrap slots may be transmitted on a common channel to all nodes and provide management information used for channel access and broadcast/traffic slot reservations. Broadcast slots may be fixed slots and may be utilized by a node to transmit information to be heard by all 1 hop neighboring nodes on the same channel. Each node may have a minimum 1 broadcast slot per frame. Traffic slots may refer to slots utilized for unicast communications and may be reserved via artery node slot loaning. Nodes may make broadcast slot transmission decisions based on information gleaned from all bootstrap slots heard in a network.

At the MAC layer, USAP may generally permit a node to assign itself a particular transmit slot based on information contained by the node regarding when it is assigned to transmit and receive and when a neighboring node is scheduled to transmit. For example, a node may need to assign itself a receive slot wherein it can receive from one, multiple, or all of its neighbors. In a typical USAP structure, there may be one or more frames per bootstrap cycle. A frame may include one or more bootstrap slots, broadcast slots or other such slots suitable for reservation or standby broadcast. A frame may further include one or more frequency channels.

Broadcast slots may be allocated based on a broadcast schedule to support a datagram service, reserved circuit, or any other control traffic that nodes may need to share. A broadcast schedule may utilize bitmaps, wherein each position corresponds to one of the bootstrap slots, which may directly correspond to a node identifier in the network. In addition, bootstrap slots may convey encoded data corresponding to broadcast transmission slots.

A broadcast slot may be utilized by a node to announce a "self-transmit" for its own slot and either unassigned, self-receive, or conflict for other slots. If a node hears two or more of its neighbors announcing self-transmit for the same slot, it may report a conflict in that slot. A node may become identified with the bootstrap slot utilized to transmit its schedule. A node may join a network by listening to bootstrap packets and selecting and transmitting its own schedule in a bootstrap slot that it may perceive is not in use. A schedule may include one or more components such as the slots, channels and destinations of a node's transmission; the slots and channels wherein the node receives packets; and the slots and channels in which a node's 1-hop neighbors transmit. Recipients may utilize this information to identify channels and slots available for use.

Method 100 may determine that broadcast slot utilization announcements received from first and second nodes indicating a broadcast slot election constitute the existence of a conflict 106. A conflict may arise in a conventional dynamic network, as movement of nodes often requires nodes to change their broadcast slot alignment and schedules. For example, a node with a schedule may move to an advantaged position where it is in the range of more nodes. It may be possible that one or more of its neighbors is utilizing the same bootstrap slot, creating ambiguity as to which node owns the bitmap positions. Further, reservations of new neighbors may conflict with those of older neighbors. As a result, each advantaged node's neighbors may be affected, as well as their neighbors, as scheduling attempts to achieve a 2 hop separation of channel slot reservations. This may be especially problematic if some nodes in a network are airborne and relatively fast moving.

Method 100 may include determining individual node identifier information for each node announcing an election to transmit in an available slot 108. Nodes in a network may be assigned unique node identifiers. A node identifier may be utilized to determine which of a second or third node may utilize the broadcast slot. Node identifier information may be transmitted to an executing node in response to a request. A node identifier may be a numerical tag or name given to each network node to distinguish it from other network nodes. Node identifier may be a hardware address such as a MAC address that uniquely identifies each node of a network, a Data Link Control (DLC) address or the like. Node identifiers may be assigned according to the potential size of a network. The network may attempt to assign a unique node identifier to each node in the network which may be broadcast to all other nodes in the network. Alternatively, nodes may self-select a unique node identifier, and may broadcast the self-selected node identifier to the rest of the nodes in the network. In this manner, a node may determine whether a network identifier is currently in use by another active node in the network. Further, nodes may periodically reaffirm the uniqueness of their respective node identifiers by broadcasting their selected node identifiers to the rest of the nodes in the network. Node identifiers are typically used to specify a unique Bootstrap slot and indirectly a node's Broadcast slot assignment.

Method 100 may also include prioritizing nodes attempting to transmit in an available slot 110. Node prioritization may be in the form of arranging nodes in an order to determine priority. For example, nodes may be arranged based on individual node identifier information determinations. In an embodiment of the invention, nodes may be arranged in a hierarchical order. For example, ranks may be assigned to conflicting nodes by an executing node, and may be representative of the values of each node's respective node identifier. It is further contemplated that nodes may be arranged based on any alternative criteria, and in any order, as desired by an executing node or user.

Method 100 may be further comprised of selecting a node for transmission in a desired broadcast slot 112 based on the node prioritization. Selecting a node for transmission in a desired broadcast slot 112 may occur prior to the completion of a single bootstrap cycle. Method 100 may be used to resolve a conflict between two nodes that advertise they will be transmitting in the same broadcast slot. The node executing method 100 will select one of the two nodes as the one to transmit in the broadcast slot. Since broadcast slots occur at a higher frequency then the bootstrap cycles, the resolution will occur before the end of the bootstrap cycle. For example, a node having the highest rank may be selected to occupy a first available broadcast slot. Node selection may result in unselected nodes backing off. Specifically, lower ranking nodes may be notified of node selection and may locate alternative slots for transmission. Transmissions in selected broadcast slot may be interference free after node selection.

It is contemplated that any node in a network may initiate method 100. It is further contemplated that a node reporting a conflict may resolve the conflict in its first available broadcast slot immediately following the bootstrap slot where the conflict is reported.

Figure 2:
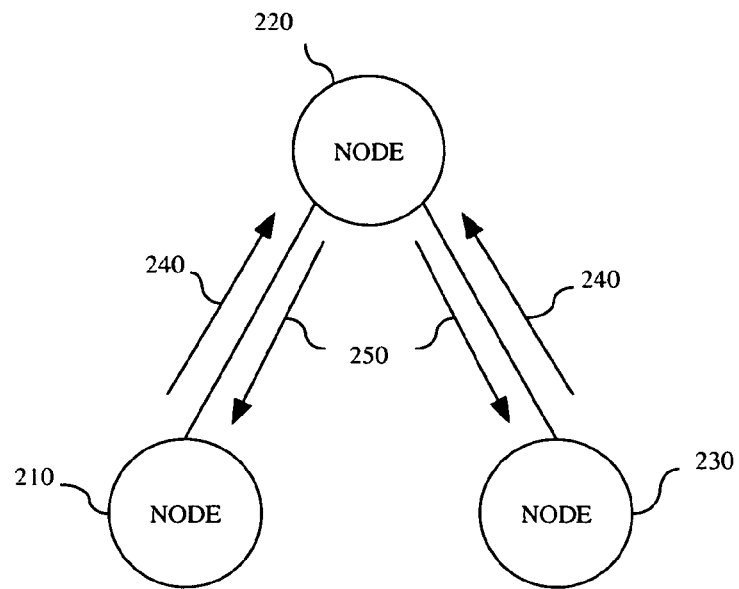
FIG. 2 depicts a broadcast conflict resolution topology in accordance with an exemplary embodiment of the present invention.

Referring to FIG. 2, a broadcast conflict resolution topology 200 in accordance with an exemplary embodiment of the present invention is shown. Conflict resolution may be especially useful for transmissions wherein one or more nodes may be hidden. The hidden node problem may occur in a point to multi-point network in which three or more nodes may be present. The hidden node problem may generally refer to a situation in which a node's proposal to utilize a particular channel and slot may be rejected if a hidden node proposes the same reservation. For example, a network may include three nodes 210-230. Node 210 may hear node 220, and vice versa, and node 220 may hear node 230, and vice versa. However, node 230 may not be able to hear a transmission from node 210 because node 230 and node 210 may be not located in proximity to hear one another. As a result, nodes 210 and 230 may be hidden from each other because of their inability to hear one another, resulting in a conflict at node 220. Therefore, in certain environments, nodes 210 and 230 may both properly transmit because they cannot hear each other on the listen phase, and so may simultaneously and properly transmit a packet. Node 220 may not hear an actual transmission of data of either node. Rather, node 220 may only hear the transmission election message and realize that a conflict exists and must be resolved.

Nodes 210-230 may transmit a bootstrap message in an order representing their individual node identifiers. Node 210 and node 230 may be connectively coupled to node 220. Node 210 may first transmit a bootstrap message 240 and announce its self transmission on broadcast slot. Node 220 may transmit its bootstrap message after node 210, and may announce its self-transmit utilizing a broadcast slot other than the broadcast slot selected by node 210. Node 230 may then self-transmit a bootstrap message 240 announcing its self-transmission in a broadcast slot that may be the same broadcast slot as node 210. As a result, nodes 210 and 230 may both announce they will broadcast in a particular slot. A bootstrap slot may have already passed for node 220. This typically prevents node 220 from alerting node 210 and node 230 of the broadcast conflict until a subsequent bootstrap cycle. Any resulting transmission from nodes 210-230 may be corrupted. However, a broadcast conflict resolution message 250 may be transmitted from node 220 to node 210 and node 230, preventing corruption of the transmissions. For example, node 220 may transmit a broadcast conflict resolution message in a slot header of the first available broadcast slot that may specify there is a conflict in the broadcast slot, and that node 210 will transmit in the slot. Node 230 may be required to locate a different broadcast slot.

Figure 3:
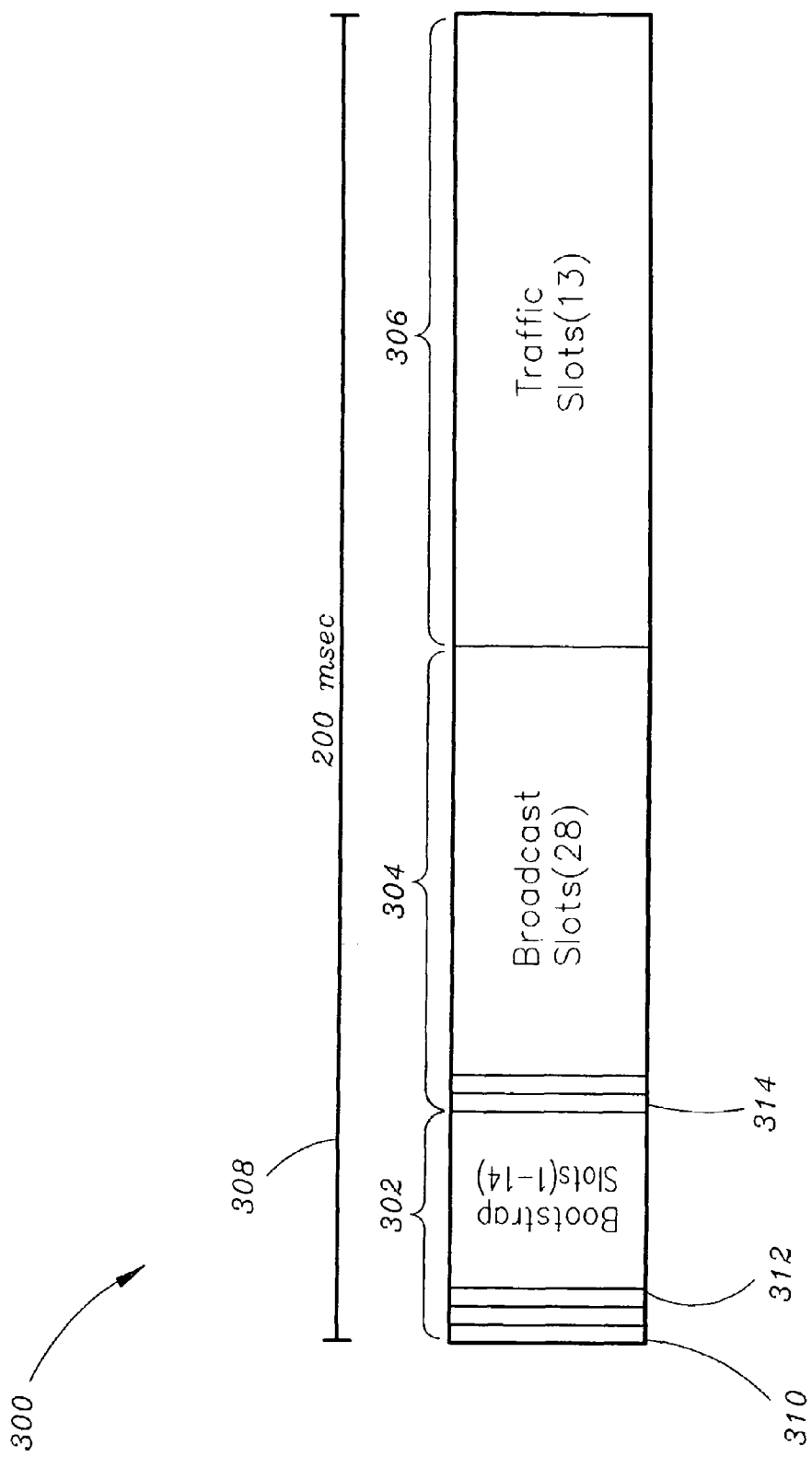
FIG. 3 is a schematic diagram showing a broadcast conflict resolution frame in accordance with an exemplary embodiment of the present invention.

Referring to FIG. 3, a schematic diagram showing a broadcast conflict resolution system 300 in accordance with an exemplary embodiment of the present invention is shown. It is contemplated that the system 300 may be implemented, for example, with a tactical data radio system (TDRS) and may be executed within one frame 308. A frame 308 such as a channelized mini-frame may be comprised of one or more bootstrap slots 302, one or more broadcast slots 304, and one or more traffic slots 306. For example, a frame 308 may be segmented, and may include 14 bootstrap slots, 28 broadcast slots and 13 traffic slots. Frame 308 may also include at least one channel. Channelization may be utilized to reduce mutual interference. Also, channelization may enable a node to broadcast on a common channel.

In the case of a TDRS, a frame 308 may represent the additive time of a group of bootstrap, broadcast, and traffic slots as shown in FIG. 3 Furthermore, a bootstrap cycle is the amount of time between a node's bootstrap slots, which is an integral number of frames. For example, in a TDRS, one frame 308 may be 200 msec long. As a result, conflict resolution protocol may resolve a conflict within a TDRS mid-frame, in the first available broadcast slot 314, within 200 msec of the conflict being detected. A first node and a third node may be located in a first bootstrap slot 310 and a third bootstrap slot 312, respectively. The first node may broadcast that it will utilize a first broadcast slot 314. The third node may also broadcast that it will utilize a first broadcast slot 314. If the first node and the third node both utilize a first broadcast slot 314, a collision may occur. However, the bootstrap slot for the second node may have already passed. Under the USAP, the second node may be prevented from alerting the first and third nodes of the conflict until a subsequent bootstrap cycle. However, the present invention may permit a second node to transmit a broadcast conflict message to indicate that the first node may utilize the first broadcast slot 314 and that a third node may be required to utilize an alternative available slot. Conflict resolution message may be broadcast by a second node before the completion of the frame, and any future broadcasts in a first broadcast slot 314 may be collision free.

It is contemplated that three or more nodes may announce transmission in a single broadcast slot. Further, one or more lower ranking nodes may announce transmission in an available broadcast slot prior to a higher node transmitting a bootstrap message indicating self-transmission in the same slot. However, upon receiving a message that a highest node may be electing to transmit in a particular broadcast slot, all subsequent lower nodes may cease transmitting in that broadcast slot, leaving a desired broadcast slot free for the highest priority node.

It is to be noted that the foregoing described embodiments according to the present invention may be conveniently implemented using conventional general purpose digital computers programmed according to the teachings of the present specification, as will be apparent one of ordinary skill in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, compact disc read-only memory (CD-ROM), magneto-optical disk, read-only memory (ROM), random access memory (RAM), erasable programmable read-only memory (EPROM), electrically erasable programmable read-only memory (EEPROM), magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for broadcast slot conflict resolution comprising:
    receiving a first broadcast slot utilization announcement from a first node during a first timeslot via multiple frequencies on a time multiplex basis;
    receiving a second broadcast slot utilization announcement from a second node during a second timeslot via multiple frequencies on a time multiplex basis, said first node and said second node being spatially isolated and not in communication, and said first broadcast slot utilization announcement being substantially similar to said second broadcast slot utilization announcement;
    determining individual node identifier information for said first node and said second node by a third node;
    said third node prioritizing said first node and said second node;
    selecting one of said first node and said second node for utilization of a broadcast slot by said third node after a bootstrap slot has passed for said third node;
    broadcasting a conflict resolution message to said first node and said second node in a slot header of a first available broadcast slot of said third node, said conflict resolution message granting permission of said selected node to transmit in said broadcast slot; and
    locating an alternate broadcast slot for transmission for the unselected of said first node and second node.

2. The method as claimed in claim 1, wherein said first node and said second node are 2 or more hops apart.

3. The method as claimed in claim 1, wherein said prioritizing said first node and said second node further comprises arranging said first node and said second node in a hierarchical order based upon said individual node identifier information.

4. The method as claimed in claim 3, wherein said individual node identifier information is a unique hardware address, data link address, or numerical tag.

5. The method as claimed in claim 4, further comprising requesting said individual node identifier information from said first node and said second node.

6. The method as claimed in claim 5, further comprising receiving said individual node identifier information from said first node and said second node.

7. A computer readable medium having computer-executable instructions for broadcast slot conflict resolution, said instructions comprising:
    receiving a first broadcast slot utilization announcement from a first node during a first timeslot via multiple frequencies on a time multiplex basis;
    receiving a second broadcast slot utilization announcement from a second node during a second timeslot via multiple frequencies on a time multiplex basis, said first node and said second node being spatially isolated and not in communication, and said first broadcast slot utilization announcement being substantially similar to said second broadcast slot utilization announcement;
    determining individual node identifier information for said first node and said second node by a third node;
    said third node prioritizing said first node and said second node;
    selecting one of said first node and said second node for utilization of a broadcast slot by said third node after a bootstrap slot has passed for said third node;
    broadcasting a conflict resolution message to said first node and said second node in a slot header of a first available broadcast slot of said third node, said conflict resolution message granting permission of said selected node to transmit in said broadcast slot; and
    locating an alternate broadcast slot for transmission for the unselected of said first node and second node.

8. The computer readable medium as claimed in claim 7, wherein said first node and said second node are 2 or more hops apart.

9. The computer readable medium as claimed in claim 8, wherein said prioritizing said first node and said second node further comprises arranging said first node and said second node in a hierarchical order based upon said node identifier.

10. The computer readable medium as claimed in claim 9, wherein said node identifier is a unique hardware address, data link address, or numerical tag.

11. The computer readable medium as claimed in claim 10, further comprising requesting said individual node identifier information from said first node and said second node.

12. The computer readable medium as claimed in claim 11, further comprising receiving said individual node identifier information from said first node and said second node.

13. A system for broadcast slot conflict resolution comprising:
    a first node for transmitting a broadcast slot utilization announcement during a first timeslot via multiple frequencies on a time multiplex basis;
    a second node for transmitting a substantially similar broadcast slot utilization announcement during a second timeslot via multiple frequencies on a time multiplex basis,
    said second node being spatially isolated from said first node and not in communication with said first node; and
    a third node, connectively coupled to said first node and said second node, wherein said third node is configured to receive said broadcast slot utilization announcement from said first node and said second node after a bootstrap slot has passed for said third node, prioritizing said first node and said second node, selecting one of said first node or said second node for transmission in a broadcast slot, and transmitting a broadcast conflict resolution message in a slot header of a first available broadcast slot prior to completion of a single frame.

14. The system as claimed in claim 13, wherein said third node requests individual node identifier information from said first node and said second node.

15. The system as claimed in claim 14, further comprising receiving said individual node identifier information from said first node and said second node.

16. The system as claimed in claim 14, wherein said individual node identifier information is a unique hardware address, data link address, or numerical tag.

17. The system as claimed in claim 16, wherein said third node arranges said first node and said second node in a hierarchical order based upon said individual node identifier information.

18. The system as claimed in claim 13, wherein said third node broadcasts a node selection to all nodes in a nodal network.

19. The system as claimed in claim 13, wherein said first node and said second node are 2 or more hops apart.

20. The system as claimed in claim 13, wherein an unselected node of said first node and said second node locates an alternative broadcast slot for transmission.

* * * * *